O. PRESTON.

LIGHTNING-CONDUCTOR, ROD OR CABLE.

No. 7,063. Reissued April 18, 1876.

*Witnesses:*

R. S. Turner

E. A. Luce

*Inventor*

O. Preston by W. J. Johnston atty.

UNITED STATES PATENT OFFICE.

OTHNIEL PRESTON, OF HORNELLSVILLE, NEW YORK.

IMPROVEMENT IN LIGHTNING CONDUCTORS, RODS, OR CABLES.

Specification forming part of Letters Patent No. 120,457, dated October 31, 1871; reissue No. 7,063, dated April 18, 1876; application filed December 16, 1875.

*To all whom it may concern:*

Be it known that I, OTHNIEL PRESTON, of Hornellsville, in the county of Steuben and State of New York, have invented a new and useful Improvement in Lightning Conductors, Rods, or Cables, to be used as lightning-conductors, and for other purposes; and I do hereby declare that the following is a full, clear, and exact description thereof, which will enable others skilled in the art to make and use the same, reference being had to the accompanying drawing, forming a part of this specification.

This invention relates to new and useful improvements in rods or cables to be used as lightning-conductors, clothes-lines, or for other purposes, whereby they are made more effective than they have hitherto been; and it consists in making the rod or cable tubular composed of a series of wires twisted together, and either with or without an inclosed metallic tube, the construction being as hereinafter more fully described.

Figure 1:
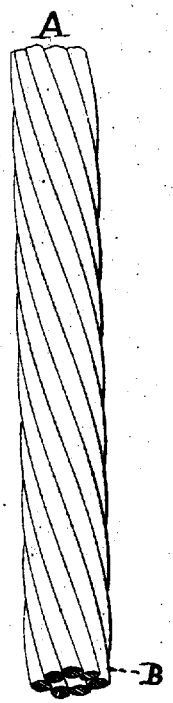
Figure 2:
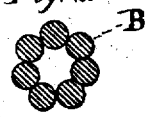

In the accompanying drawing, Figure 1 represents a section of my rod or cable forming a conductor constructed of wires twisted together forming a tube. Fig. 2 is a cross-section of Fig. 1.

Similar letters of reference indicate corresponding parts.

A represents the conductor; B, the wires; C, the interior metallic tube. The wires B are twisted together either around a solid core, which is removed, or a metallic tube, C, which latter is allowed to remain; in either case a tubular conductor is formed, which greatly increases the extent of surface of the conductor.

I am aware that it is contended that the conductivity of a lightning-rod is according to the area of its cross-section. My own experience, which has not been very limited in the business of manufacturing and putting up lightning-conductors, leads me to doubt the entire correctness of that theory. In practice I have found that surface has much to do with the conductivity of lightning-rods. Conductors composed of broad straps of metal having great superficial area, and but slight cross-sectional area, have been employed with good results. I am aware that, with a view of increasing the superficial area, conductors have been made of woven wire, and also of braided or plaited wire in the tubular form.

I disclaim all conductors constructed by either weaving, braiding, or plaiting the wire.

My lightning-conductor is made of wires twisted together around a core or tube, and is in form a hollow wire rope, and continuous from end to end, and may be of any required length. In twisting the wires around a solid core, the core is withdrawn, which leaves the conductor tubular. If twisted around a metallic tube, the tube is allowed to remain, which also leaves the conductor tubular. In either case the conductor is a tube composed of wires twisted together, and having the strength and flexibility of a wire rope when made without the interior tube, but which is, of course, more stiff and rigid when made with the tube.

Having thus described my invention, I claim as new and desire to secure by Letters Patent—

The tubular rod or cable A, composed of wires B, twisted together, substantially as shown and described.

In testimony that I claim the foregoing I have hereunto set my hand this 15th day of December, 1875.

OTHNIEL PRESTON.

Witnesses:

L. A. LUCE,

P. S. BURDITT.